(12) United States Patent
Lloyd

(10) Patent No.: US 9,168,807 B2
(45) Date of Patent: Oct. 27, 2015

(54) INTEGRATED CROSSOVER VALVE

(75) Inventor: Jeffrey M. Lloyd, Auburn Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 2067 days.

(21) Appl. No.: 12/253,527

(22) Filed: Oct. 17, 2008

(65) Prior Publication Data

US 2009/0140474 A1 Jun. 4, 2009

Related U.S. Application Data

(60) Provisional application No. 60/990,935, filed on Nov. 29, 2007.

(51) Int. Cl.
*B60G 17/052* (2006.01)

(52) U.S. Cl.
CPC .......... *B60G 17/0523* (2013.01); *B60G 17/052* (2013.01); *B60G 2202/152* (2013.01); *B60G 2204/81* (2013.01); *B60G 2204/82* (2013.01); *B60G 2204/8304* (2013.01); *B60G 2300/07* (2013.01); *B60G 2400/204* (2013.01); *B60G 2400/51222* (2013.01); *B60G 2500/20* (2013.01); *B60G 2800/012* (2013.01)

(58) Field of Classification Search
USPC ............ 267/64.16; 280/5.502, 5.514, 124.06, 280/124.161
See application file for complete search history.

(56) References Cited

U.S. PATENT DOCUMENTS

| | | | | |
|---|---|---|---|---|
| 4,091,738 | A | | 5/1978 | Platner |
| 4,836,511 | A | * | 6/1989 | Buma et al. ................. 267/64.16 |
| 5,273,308 | A | | 12/1993 | Griffith |
| 5,555,173 | A | * | 9/1996 | Campbell et al. ............... 701/37 |
| 7,722,055 | B2 | | 5/2010 | Hall et al. |
| 2001/0006285 | A1 | * | 7/2001 | Franzini ................. 280/124.106 |
| 2003/0132594 | A1 | * | 7/2003 | Den Hartog ............. 280/124.16 |
| 2004/0061293 | A1 | | 4/2004 | Barbison |
| 2004/0094929 | A1 | * | 5/2004 | Ribi ........................ 280/124.161 |
| 2005/0067239 | A1 | * | 3/2005 | Bauer et al. .................... 188/297 |
| 2007/0200304 | A1 | * | 8/2007 | Brookes et al. ............ 280/5.514 |
| 2008/0228352 | A1 | * | 9/2008 | Brookes et al. .................. 701/37 |
| 2008/0290617 | A1 | * | 11/2008 | Bounds ........................ 280/5.5 |

FOREIGN PATENT DOCUMENTS

| | | |
|---|---|---|
| DE | 10039598 | 2/2002 |
| EP | 1101637 | 5/2001 |
| JP | 05085135 | 4/1993 |
| WO | 2007095207 | 8/2007 |

OTHER PUBLICATIONS

Extended European Search Report dated Mar. 10, 2009.

* cited by examiner

*Primary Examiner* — Christopher Schwartz
(74) *Attorney, Agent, or Firm* — Brooks Kushman P.C.

(57) ABSTRACT

An air suspension includes a crossover valve in fluid communication with a manifold, a first set of springs in fluid communication with the manifold through a first set of valves, and a second set of springs in fluid communication with the manifold through a second set of valves. The crossover valve is movable between an open position to allow fluid communication to each of the first and the second sets of springs and a closed position that separates the first set of springs from the second set of springs.

15 Claims, 2 Drawing Sheets

INTEGRATED CROSSOVER VALVE

RELATED APPLICATIONS

This application claims priority to U.S. Provisional Application No. 60/990,935, which was filed on Nov. 29, 2008.

TECHNICAL FIELD

This invention generally relates to a crossover valve for an air suspension.

BACKGROUND OF THE INVENTION

Air suspensions are often utilized in off-road vehicles; however, operational performance of these off-road vehicles can be limited by roll stiffness of the suspension. Roll stiffness limits an articulation angle of the suspension and keeps some vehicle tires from contacting the ground under certain off-road conditions. For example, uneven ground can cause one wheel to have ground contact while a laterally opposite wheel remains out of contact with the ground due to the limited articulation of the suspension.

One solution has been to use a crossover valve in an axle to vary stiffness as needed between laterally opposed springs in an attempt to maintain four wheel contact with the ground. The crossover valve attenuates stiffness by allowing air from one spring on one side of the vehicle to be communicated to a laterally opposite spring on the other side of the vehicle. For a typical four-wheel drive vehicle, one crossover valve is used on a front axle to allow air communication between front right and front left springs, and another crossover valve is used on a rear axle to allow air communication between rear right and rear left springs.

The inclusion of the two crossover valves is disadvantageous from a cost and material perspective. Further, due to limited packaging space, it is a challenge to route and plumb the crossover valves into the suspension.

Thus, there is a need for a more cost effective suspension control that provides desired stiffness attenuation in addition to overcoming other deficiencies in the prior art as outlined above.

SUMMARY OF THE INVENTION

An air suspension system includes a crossover valve that is integrated into a suspension valve block. The suspension system has a plurality of springs including front and rear springs, and left and right springs. Each spring has an associated spring valve. The crossover valve, which is normally open, can separate left and right portions of the valve block. When the crossover valve is closed all associated spring valves can be opened to allow flow between right and left springs but not between front and rear springs.

In one example, the air suspension includes a crossover valve in fluid communication with a manifold, a first set of springs in fluid communication with the manifold through a first set of valves, and a second set of springs in fluid communication with the manifold through a second set of valves. The crossover valve is movable between an open position to allow fluid communication to each of the first and the second sets of springs and a closed position that separates the first set of springs from the second set of springs. Fluid communication occurs only between springs in the first set of springs when the crossover valve is in the closed position, and fluid communication occurs only between springs in the second set of springs when the crossover valve is in the closed position.

In one example, the first set of springs includes a front right spring and a front left spring for a front axle, and the first set of valves includes a front right valve controlling fluid communication between the manifold and the front right spring and a front left valve controlling fluid communication between the manifold and the front left spring. The second set of springs includes a rear right spring and a rear left spring for a rear axle, and the second set of valves includes a rear right valve controlling fluid communication between the manifold and the rear right spring and a rear left valve controlling fluid communication between the manifold and the rear left spring.

In one example, the air suspension system includes a control, such as an electronic control unit, computer, microprocessor, etc., which generates control signals to open and close the valves. The crossover valve and the first and second sets of valves can only be moved between open and closed positions in response to a control signal generated by the control.

These and other features of the present invention can be best understood from the following specification and drawings, the following of which is a brief description.

DETAILED DESCRIPTION OF THE PREFERRED EMBODIMENT

Figure 1A:
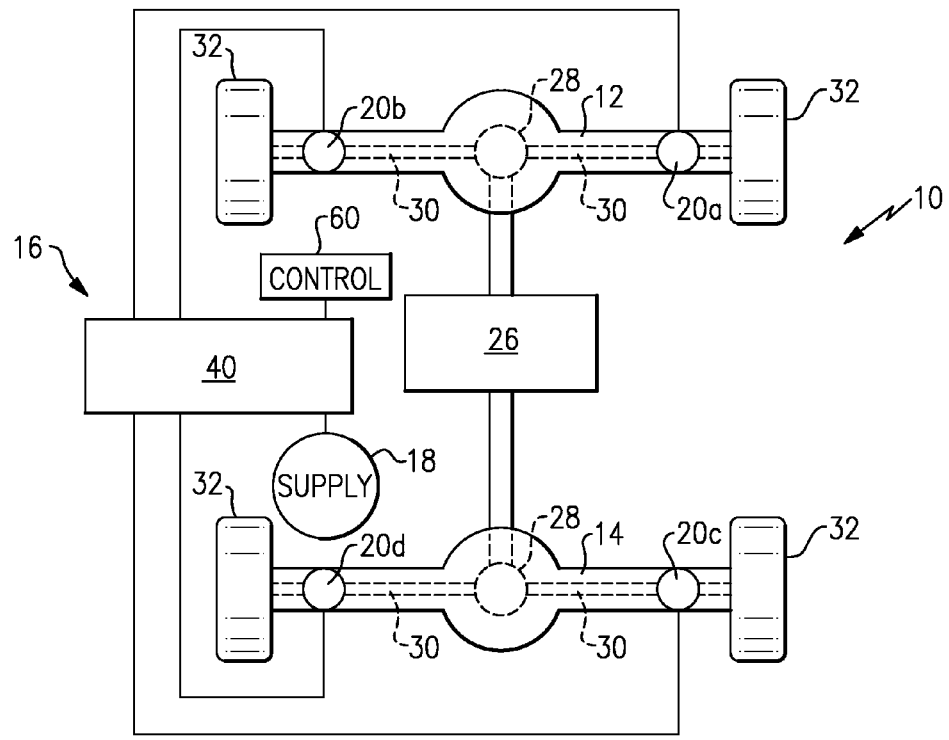
FIG. 1A is top schematic view of a vehicle with an air suspension incorporating the subject invention.

FIG. 1A shows a vehicle 10 that includes a front axle 12 and a rear axle 14. An air suspension system 16 includes a reservoir 18 and a plurality of springs 20a-d that are in fluid communication with the reservoir 18. The springs 20a-d are associated with the front 12 and rear 14 axles. Spring 20a comprises a right front spring, spring 20b comprises a left front spring, spring 20c comprises a right rear spring, and spring 20d comprises a left rear spring. The springs 20a-d absorb road load inputs to provide a comfortable ride. Air pressure within the springs 20a-d can be varied to improve handling when the vehicle 10 is used in an off-road application, for example.

Figure 1B:
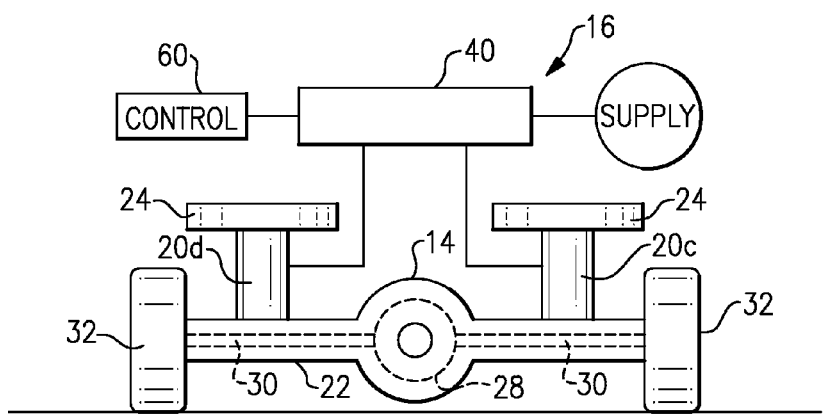
FIG. 1B is a front schematic view of a rear axle from FIG. 1A.

FIG. 1B shows a front view of the rear axle 14 and air suspension system 16. The suspension system 16 would be similarly configured for the front axle 12. The springs 20a-d are typically positioned between a vehicle chassis or frame member 24 and a component that is either associated with the axles or which is another suspension component. In the example shown in FIG. 1B, the right and left rear springs 20c, 20d are supported by an axle housing 22. However, it should be understood that while the springs are shown as being positioned directly between the associated axle and the frame member 24, the springs could also be positioned between a suspension component, such as a control arm for example, which would be supported by the axle and the frame member.

In the example of a four-wheel drive vehicle, the front 12 and rear 14 axles are drive axles that receive driving input from a power source 26 such as an engine or an electric motor for example. The front 12 and rear 14 axles each include gear assemblies 28 that drive axle shafts 30 to rotate a pair of laterally spaced wheels 32.

As discussed above, the springs 20a-d are each filled with air and the pressure inside of the springs 20a-d is varied to provide a desired ride and handling characteristic. As shown in FIG. 1A, the front right 20a and front left 20b springs are associated with the front axle 12, and the rear right 20c and rear left 20d springs are associated with the rear axle 14.

Figure 2:
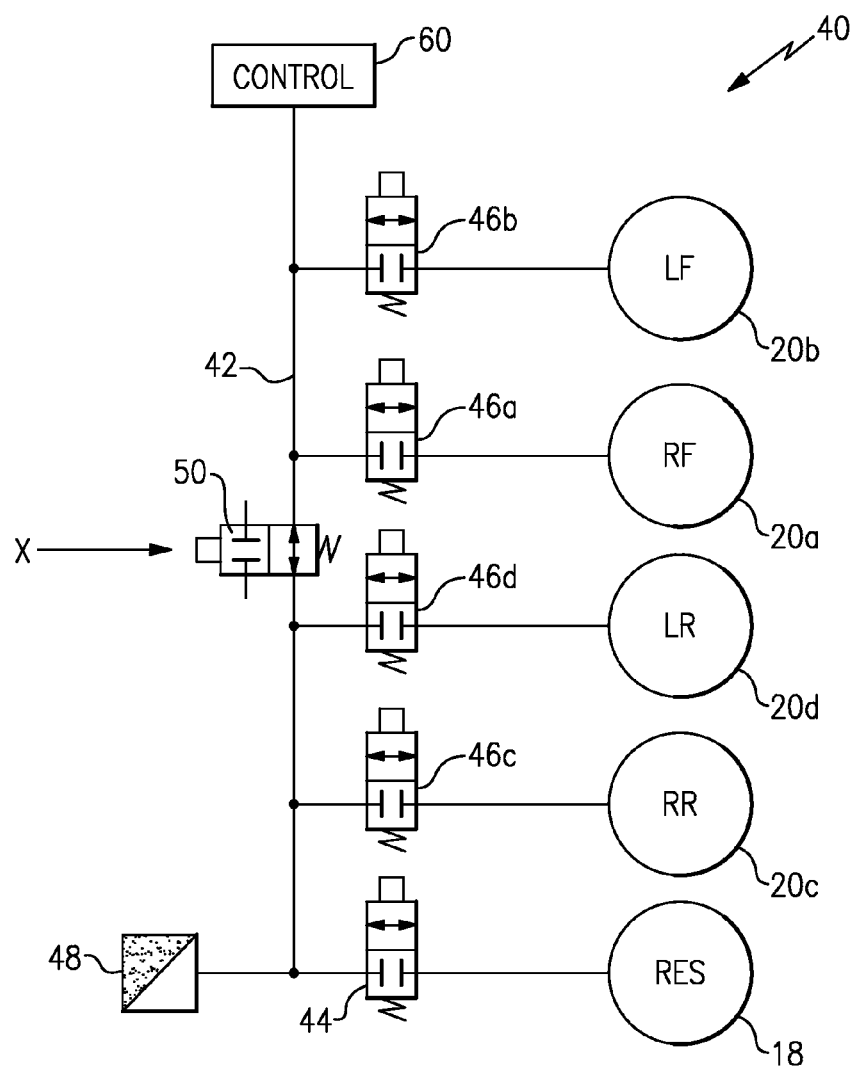
FIG. 2 is a schematic diagram including a pressure manifold, crossover valve, springs, and spring valves.

The air suspension system 16 comprises a suspension valve block 40, shown in detail in FIG. 2, which controls air supply to the springs 20a-d. The valve block 40 is a six valve, cross-linked configuration and includes a manifold 42 that is connected to the reservoir 18 via a reservoir valve 44. Also in fluid communication with the manifold 42 are a plurality of valves 46a-d and the plurality of springs 20a-d. A front right valve 46a controls fluid communication between the manifold 42 and the front right spring 20a, a front left valve 46b controls fluid communication between the manifold 42 and the front left spring 20b, a rear right valve 46c controls fluid communication between the manifold 42 and the rear right spring 20c, and a rear left valve 46d controls fluid communication between the manifold 42 and the rear left spring 20d.

A sensor 48 monitors pressure in the manifold 42. The sensor 48 can be used to check pressure at each of the plurality of valves 46a-d and the reservoir valve 44 to make sure that over-pressurization is not occurring.

A crossover valve 50 is also in fluid communication with the manifold 42. The crossover valve 50 controls fluid communication between front 20a, 20b and rear 20c, 20d springs, and controls fluid communication between right 20a, 20c and left 20b, 20d springs to vary stiffness as needed to maintain ground contact for all wheels. This will be discussed in greater detail below.

The crossover valve 50 is in fluid communication with the manifold 42 at a position that can fluidly separate the springs for front 12 and rear 14 axles from each other. Each valve from the plurality of valves 46a-d is in a normally closed position and the crossover valve 50 is in a normally open position. This would allow air to flow between the springs 20a, 20b on the front axle 12 and the springs 20c, 20d on the rear axle 14 once the valves 46a-d are opened.

When the crossover valve 50 is in a closed position, the manifold 42 is essentially cut in half with fluid communication being prevented between front springs and rear springs, i.e. air cannot flow between springs 20a, 20b on the front axle 26 and springs 20c, 20d on the rear axle 14.

When the front right 46a and front left 46b valves are open and the crossover valve 50 is closed, fluid communication only occurs between the front right 20a and front left 20b springs. When the rear right 46c and rear left 46d valves are open and the crossover valve 50 is closed, fluid communication only occurs between the rear right 20c and rear left 20d springs. Air pressure within one of the springs 20a, 20b can be increased to provide a greater stiffness while air in the other of the springs 20a, 20b would be decreased to provide a softer spring. This adjustment between right and left springs on a common axle provides stiffness attenuation as needed to maintain ground contact for all for wheels.

A controller 60, such as a computer, microprocessor, or electronic control unit for example, controls opening and closing of the crossover valve 50 and the plurality of valves 46a-d. In one example, the controller 60 generates an electronic control signal to close the crossover valve 50 when a four-wheel drive low mode is activated. In this mode, the controller 60 also generates control signals to open the plurality of valves 46a-d, and fluid communication occurs back and forth only between the right and left front springs 20a, 20b and only back and forth between the right and left rear springs 20c, 20d, i.e. fluid transfer only occurs right and left between two pairs of springs associated with the same axle. There is no fluid transfer between front 20a, 20b and rear 20c, 20d springs in this mode, i.e. fluid from the front springs 20a, 20b cannot be communicated to the rear springs 20c, 20d. If a predetermined speed limit is exceeded, or if a vehicle user de-selects the four-wheel drive low mode, the controller 60 generates control signals to open the crossover valve 50 and to close the plurality of valves 46a-d resulting in a return to a normal operation mode. It should be understood that while a four wheel drive configuration is shown with front and rear drives axles, the subject air suspension system 16 could also be used with other types of axle configurations.

As such, a single crossover valve 50 is included in the manifold 42 and is normally open to separate left and right portions of the valve block 40. When this crossover valve 50 is closed, each valve from the plurality of valves 46a-d can be opened to allow flow between left and right springs but not between front and rear springs. This configuration provides significant cost savings from a material and labor perspective.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A suspension comprising:
a valve block comprising a manifold, a crossover valve, and first and second sets of valves;
a first set of springs in fluid communication with said first set of valves, wherein said first set of springs comprises a front right spring and a front left spring for a front axle;
a second set of springs in fluid communication with said second set of valves, wherein said second set of springs comprises a rear right spring and a rear left spring for a rear axle; and
said crossover valve being movable between an open position to allow fluid communication to each of said first and said second sets of springs and a closed position that separates said first set of springs from said second set of springs;
wherein fluid communication occurs only between springs in said first set of springs and fluid communication occurs only between springs in said second set of springs when said crossover valve is in said closed position;
wherein said first set of valves includes a front right valve controlling fluid communication between said manifold and said front right spring and a front left valve controlling fluid communication between said manifold and said front left spring, wherein fluid communication occurs between said front right spring and said front left spring when said crossover valve is closed and said front right and said front left valves are open;
wherein said second set of valves includes a rear right valve controlling fluid communication between said manifold and said rear right spring and a rear left valve controlling fluid communication between said manifold and said rear left spring, wherein fluid communication occurs between said rear right spring and said rear left spring when said crossover valve is closed and said rear right and said rear left valves are open;
wherein said front right valve, said front left valve, said rear right valve, and said rear left valve are normally closed and said crossover valve is normally open; and
wherein said crossover valve is only activated to move to said closed position when in a four wheel drive low mode.

2. The suspension according to claim 1 including a control that generates a control signal to move said crossover valve between open and closed positions.

3. The suspension according to claim 2 wherein said first and said second sets of valves are only responsive to open and close signals generated by said control.

4. The suspension according to claim 1 wherein said valve block comprises a six valve, cross-linked configuration, and wherein said first set of valves comprises a pair of front axle valves and said second set of valves comprises a pair of rear axle valves, and wherein said six valve, cross-linked configuration includes said crossover valve, a reservoir valve, said pair of front axle valves, and said pair of rear axle valves.

5. The suspension according to claim 4 wherein said valve block comprises a single unified structure.

6. The suspension according to claim 1 including a pressure sensor to monitor pressure in said manifold.

7. The suspension according to claim 1 wherein said valve block that includes said crossover valve and said first and said second sets of valves comprises a monolithic structure.

8. The suspension according to claim 1 wherein said first and said second sets of springs comprise air springs.

9. The suspension according to claim 1 wherein said valve block includes a reservoir valve that is in fluid communication with a reservoir.

10. A method of controlling a vehicle suspension comprising:
(a) fluidly connecting a first set of springs to a first set of valves and associating the first set of springs with a front axle, wherein the first set of springs includes a front right spring and a front left spring, and the first set of valves includes a front right valve and a front left valve;
(b) fluidly connecting a second set of springs to a second set of valves and associating the second set of springs with a rear axle, wherein the second set of springs comprises a rear right spring and a rear left spring, and the second set of valves includes a rear right valve;
(c) fluidly connecting a crossover valve to the first and second sets of valves;
(d) moving the crossover valve to an open position to allow fluid communication to each of the first and second sets of springs;
(e) moving the crossover valve to a closed position that separates the first set of springs from the second set of springs;
(f) providing a valve block comprising a manifold, the crossover valve, and the first and second sets of valves;
controlling fluid communication between the manifold and the front right spring with the front right valve;
controlling fluid communication between the manifold and the front left spring with the front left valve;
allowing fluid communication between the front right spring and the front left spring when the crossover valve is closed and the front right and the front left valves are open;
controlling fluid communication between the manifold and the rear right spring with the rear right valve;
controlling fluid communication between the manifold and the rear left spring with the rear left valve;
allowing fluid communication between the rear right spring and the rear left spring when the crossover valve is closed and the rear right and rear left valves are open; and
only closing the crossover valve when in a four wheel drive low mode;
wherein the front right valve, the front left valve, the rear right valve, and the rear left valve are normally closed and the crossover valve is normally open.

11. The method according to claim 10 including generating an electronic control signal to move the crossover valve between open and closed positions.

12. The method according to claim 11 including generating electronic control signals to move the first and the second sets of valves between open and closed positions.

13. The method according to claim 10 only providing fluid communication between springs in said first set of springs when the crossover valve is in the closed position, and only providing fluid communication between springs in the second set of springs when the crossover valve is in said closed position.

14. The method according to claim 10 including forming the valve block as a single unified structure that includes the manifold, cross-over valve, and the first and second sets of valves.

15. The method according to claim 10 including locating a reservoir valve within the valve block, the reservoir valve being in fluid communication with a reservoir.

\* \* \* \* \*